United States Patent [19]

Day

[11] 4,131,939
[45] Dec. 26, 1978

[54] CONSTANT CURRENT POWER SUPPLY

[76] Inventor: Ralph D. Day, 117 NW. 94th St., Miami Shores, Fla. 33153

[21] Appl. No.: 782,913

[22] Filed: Mar. 30, 1977

[51] Int. Cl.² .............................................. H02M 7/06
[52] U.S. Cl. ...................................... 363/126; 307/11; 323/75 F; 323/75 P; 363/44
[58] Field of Search .......................... 307/321, 11, 12; 323/75 P, 75 F; 363/44, 45, 125, 126

[56] References Cited

U.S. PATENT DOCUMENTS

| | | | |
|---|---|---|---|
| 2,964,637 | 12/1960 | Keizer | 307/321 X |
| 3,012,192 | 12/1961 | Lion | 323/75 F |
| 3,978,388 | 8/1976 | de Vries | 363/45 |

Primary Examiner—William M. Shoop
Attorney, Agent, or Firm—Berman, Aisenberg & Platt

[57] ABSTRACT

A power supply circuit for converting alternating current into d.c. voltage at substantially constant current for loads varying over a wider range of resistance or impedance, allowing the d.c. output voltage to vary in accordance with the load resistance, or impedance, or to be limited to a maximum value. A full-wave conversion circuit comprises a.c. input terminals, a network having parallel-connected arms containing respective diodes and output capacitors, the diodes being oppositely poled, and input capacitor means connected in series with the network to the a.c. input terminals. The junctions of the diodes with the output capacitors are the d.c. output terminals. A half-wave version of the circuit consists of a.c. input terminals, and a network consisting of series-connected diodes connected across an output capacitor, the network being connected to the a.c. input terminals through an input capacitor which is connected between one of the a.c. input terminals and the common junctions of the diodes. The d.c. output is taken across the series-connected diodes. The full-wave conversion circuit may be expanded by an additional pair, or pairs of diodes and additional pairs of output capacitors to provide for many d.c. loads to be serviced simultaneously.

8 Claims, 4 Drawing Figures

CONSTANT CURRENT POWER SUPPLY

This invention relates to electrical power supply devices, and more particularly to a power supply circuit for converting alternating current into direct current(s) and for maintaining substantially constant output current over a wide range of loading conditions.

A main object of the invention is to provide a novel and improved constant current power supply device which is simple in construction, which is inexpensive to manufacture, and which dissipates a minimum amount of heat.

A further object of the invention is to provide an improved constant current power supply device which maintains substantially constant output current over a wide range of output loads, the device not involving the use of transformers, being substantially unaffected by input voltage variations such as short-duration voltage drops or voltage spikes, suffering no damage when a short circuit occurs at its output terminals, and being able to operate indefinitely under short circuit conditions.

A still further object of the invention is to provide an improved constant current power supply device which maintains substantially constant output current over a wide range of output load conditions and which are operate safely over an output impedance range from short circuit to open-circuit conditions, which has relatively small output ripple and which requires no additional filtering for many applications, which is very compact in physical size, which operates with relatively small power loss, and which provides numerous positive and negative d.c. voltage with respect to a common junction terminal.

Further objects and advantages of the invention will become apparent from the following description and claims and from the accompanying drawings, wherein:

Figure 1:
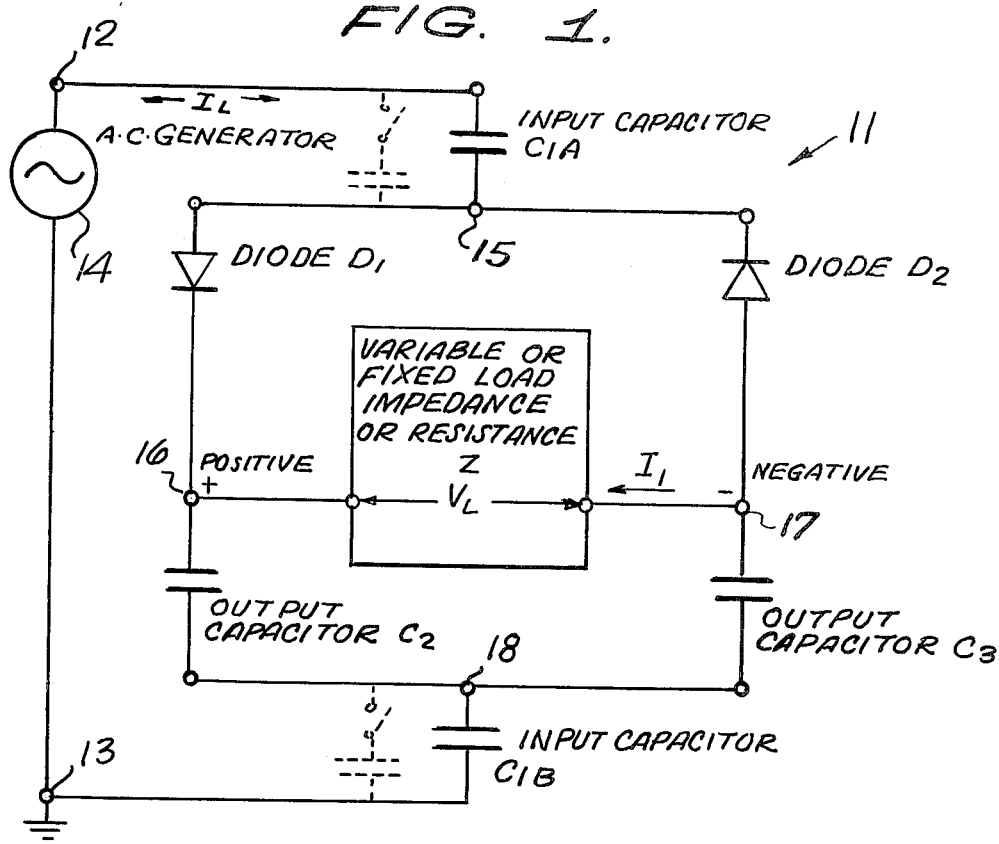
FIG. 1 is a schematic diagram of a typical full-wave constant-current power supply circuit constructed in accordance with the present invention.

Referring to the drawings, and more particularly to FIG. 1, 11 generally designates a full-wave constant current power supply circuit according to the present invention. The circuit 11 has a pair of input terminals 12 and 13 which may be connected to a suitable sine-wave a.c. supply source, such as an a.c. generator 14. Input terminal 12 is connected through an input capacitor C1A to the junction 15 of a pair of series-connected diodes D1 and D2, the diode D1 being poled to provide positive voltage at output terminal 16 and diode D2 being poled to provide negative voltage at output terminal 17. Output capacitors C2 and C3, equal or unequal in capacitance, are connected across terminals 16 and 17, and another input capacitor C1B, equal or unequal in capacitance to capacitor C1A, is connected between grounded a.c. input terminal 13 and the common junction 18 of the output capacitors C2, C3. The variable or fixed load impedance or resistance Z is connected across the output terminals 16 and 17.

Operation of the FIG. 1 circuit will be readily apparent. During one half of each a.c. cycle junction 15 of of input capacitor C1A will be going positive with respect to load terminals 16 and 17. A flow of electrons from 17 through the load to terminal 16, and through diode D1 is biased off until the generator voltage at 15 goes higher than that at terminal 16. Diode D1 then conducts until the generator wave form turns down and drops to the value of that at terminal 16 at which time the diode D1 is reverse biased for the rest of the sine wave and the flow is cut off. During the next half of each A.C. cycle, junction 15 will be going negative. Electron flow through diode D2, terminal 17, the load to terminal 16 is cut off until the generator voltage is negative with respect to the point 17. Diode D2 then conducts until the voltage again equals that at terminal 17. During the rest of the cycle diode D2 is reverse biased and the electron flow is cut off. The described electron flow through the load Z thus occurs during both halves of each cycle and is in the same direction providing full wave rectification. By selecting output capacitors C2 and C3 having a much longer time constant than that of the A.C. generator, the D.C. current $I_1$ flows during the entire A.C. cycle.

Figure 2:
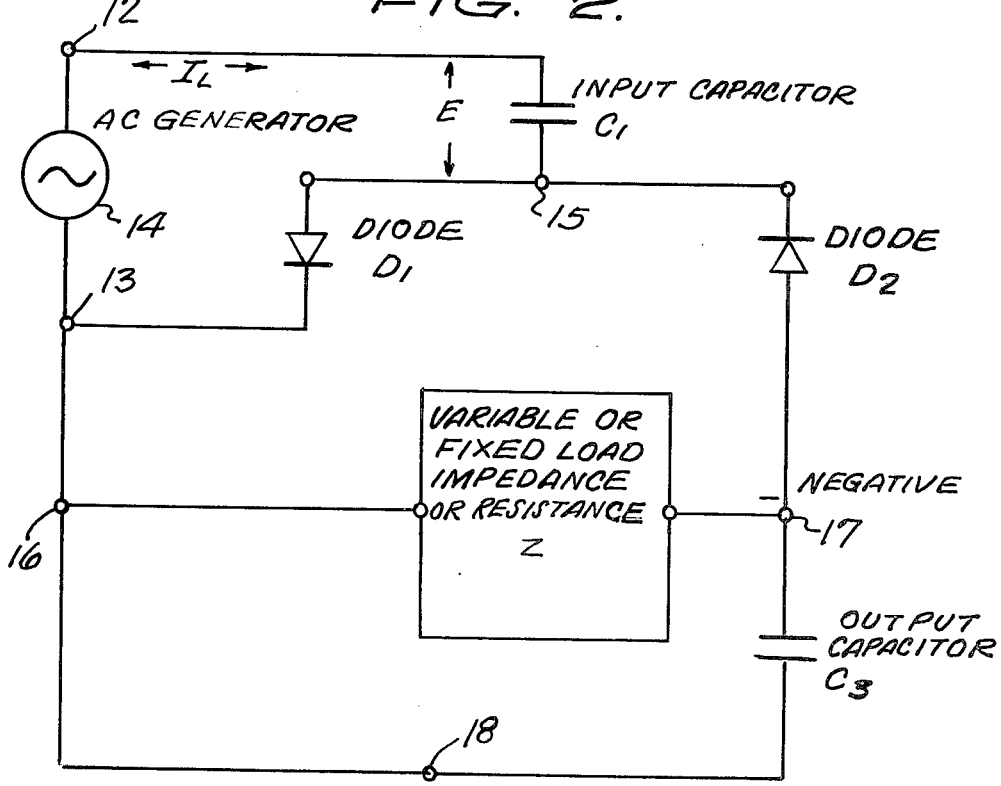
FIG. 2 is a schematic diagram of a half-wave constant-current power supply circuit according to the present invention.

The embodiment shown in FIG. 2 is similar to that of FIG. 1, but operates as a half-wave type of power supply, the output capacitor $C_3$ being connected directly across the d.c. output terminals 16, 17 and being alternately charged by the rectified d.c. pulses from the diodes $D_1$ and $D_2$.

The input capacitors C1A and C1B may be replaced, as in FIG. 2, by a single input capacitor C1 having the equivalent capacitance of series-connected capacitors C1A and C1B, which may be connected in place of capacitor C1A, with capacitor C1B omitted and terminal 18 connected directly to input terminal 13. Output capacitor $C_2$ being also omitted, terminals 18 and 16 are directly connected to each other. In the later discussion of operation formulas, the capacitance C1 will be used as the equivalent capacitance of series-connected input capacitors C1A, C1B, although the dividing up of the input capacitors in the manner shown in FIG. 1 is preferred because it gives better isolation from the a.c. line; however, it requires the input capacitors C1A and C1B each to have double the capacitance of a single input capacitor C1. It is optional to employ either a single input capacitor C1, as in FIG. 2, or the separate input capacitors C1A and C1B shown in FIG. 1. Additional capacitors may be switched across capacitors C1A and C1B, as shown in dotted view, to increase the input line current, as required.

Figure 3:
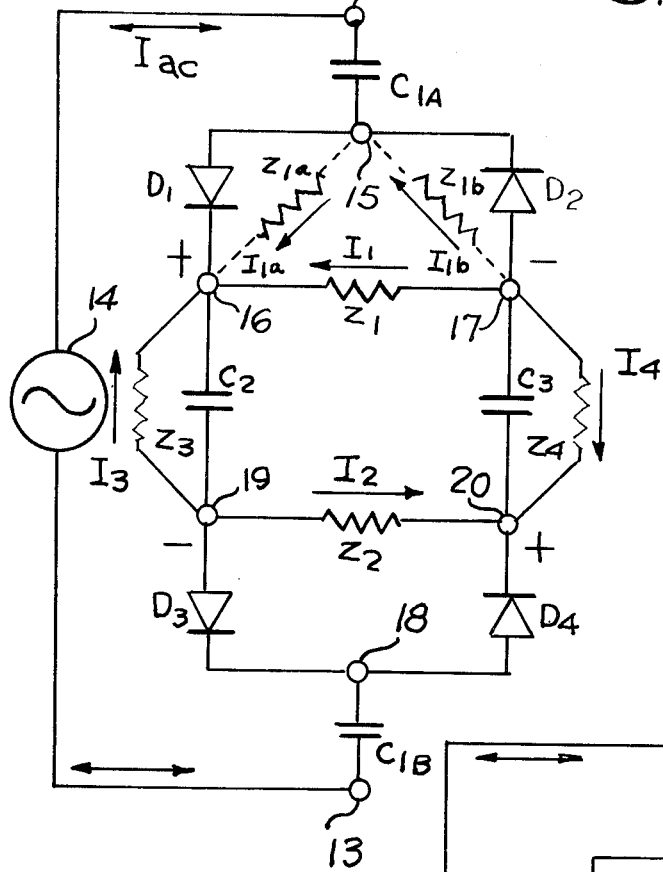
FIG. 3 is a schematic circuit diagram of a full-wave constant current power supply similar to that of FIG. 1, but expanded by an additional pair of diodes to provide a plurality of positive and negative voltages for a plurality of d.c. loads.

The modified full-wave rectifying circuit of FIG. 3 is in all respects similar to that of FIG. 1 and operates in the same manner, except that a second pair of d.c. output terminals 19 (−) and 20 (+) have been inserted after output capacitors $C_2$ and $C_3$ and another pair of diodes $D_3$, $D_4$ is series connected across the second pair of output terminals, diodes $D_3$ and $D_4$ being oppositely poled with respect to a.c. input terminal 13. A second load $Z_2$ may be connected across output terminals 19, 20 and d.c. current $I_2$ will flow because of diodes $D_3$ and $D_4$ for the reasons explained previously with respect to the circuit containing diodes $D_1$ and $D_2$. Additional loads $Z_3$ and $Z_4$ may be connected across the output capacitors $C_2$ and $C_3$, respectively, and between the terminals 16 and 19 and 17 and 20, yielding d.c. currents $I_3$ and $I_4$. If loads $Z_{1a}$ and $Z_{1b}$ are connected between terminals 15 and 16 and 15 and 17 respectively, d.c. currents $I_{1a}$ and $I_{1b}$ will flow in these loads.

Current $I_{1a}$ equals $I_{1b}$ and is parallel to $I_1$.

Current $I_1$ equals $I_2$ and has properties of a series circuit. If $I_2$ is open circuited then no current flows in $I_1$. If $I_1$ is open circuited then the current $I_2$ goes to zero, voltage goes to zero between points 19 and 20.

Current $I_3$ equals $I_4$ and has properties of a series circuit. If $I_3$ is open circuited then the current in $I_4$ goes to zero. If $I_4$ is open circuited then the current in $I_3$ goes to zero. In all cases where two points are connected through a resistance and current goes to zero, voltage also goes to zero.

Currents ($I_1$:$I_2$) and currents ($I_3$:$I_4$) have properties of a parallel circuit. Currents ($I_1$:$I_2$) plus ($I_3$:$I_4$) equals $I_{ac}$. The four currents appear to be in parallel since: $I_1+I_2+I_3+I_4 = I_{ac}$(RMS).

From the above, it is readily apparent that a total of six or more d.c. loads may be powered by the circuit of FIG. 3.

Figure 4:
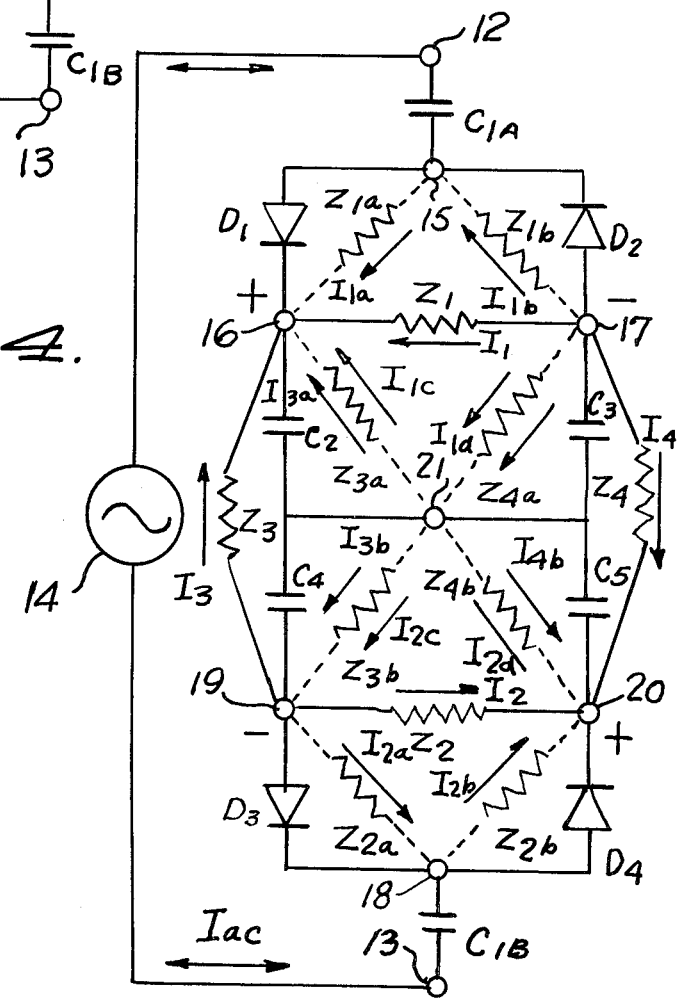
FIG. 4 is a schematic diagram of another modified circuit similar to FIG. 3, but adding an additional pair of output capacitors and a common junction for both pairs of output capacitors.

The modified circuit of FIG. 4 is in all respects identical with and functions in the same manner as that of FIG. 4, except that an additional pair of output capacitors $C_4$ and $C_5$ have been respectively inserted between output capacitor $C_2$ and output terminal 19 and between capacitor $C_3$ and terminal 20. In addition, a common junction 21 for the four capacitors $C_2$, $C_3$, $C_4$, and $C_5$ has been provided which can act as another d.c. output terminal. This enables the powering of additional loads $Z_{3a}$, $Z_{4a}$, $Z_{3b}$, $Z_{4b}$, $Z_{2a}$, and $Z_{2b}$.

In FIG. 4:

Currents $I_{1a}$ and $I_{1b}$ are in series and in parallel with $I_1$; Currents $I_{1c}$ and $I_{1d}$ are in series and in parallel with $I_1$; Currents $I_{2c}$ and $I_{2b}$ are in series and in parallel with $I_2$; Currents $I_{2a}$ and $I_{2b}$ are in series and in parallel with $I_2$; Currents $I_{3a}$ and $I_{3b}$ are in series and in parallel with $I_3$; Currents $I_{4a}$ and $I_{4b}$ are in series and in parallel with $I_4$.

Twelve load currents are shown. Voltage limiting may be used to provide twelve voltages of the same or different absolute values. Additional sections may be catenated to provide additional currents.

Referring again to the typical full-wave rectifying power supply of FIG. 1, voltage and current operating characteristics may be explained further with regard to formulas as developed below.

Assuming the input a.c. voltage to be 117 volts R.M.S., 60 Hz, single phase sine wave, it can be shown that the input line current $I_L$ in amperes will be given by approximation $I_L = (330-V_L) \times 0.0000668 C \times CF$ (Correction Factor in amperes) where $V_L$ is the d.c. output voltage across terminals 16, 17 and C is the capacitance in mfd. of $C_1$ (equivalent capacitance of C1A, C1B).

This is derived from the basic ohm's Law current formula:

$I_L = E/Z_c$, where

E = Voltage across the equivalent input capacitor $C_1$, and $Z_c$ = impedance of the input capacitor $C_1$ in the circuit.

The diodes $D_1$ and $D_2$ are biased to cut-off by either the negative or positive values of the d.c. voltage $V_L$. If, for example, there is a d.c. voltage of 50 volts ($V_L = 50$) from negative terminal 17 to positive terminal 16, then there will be +25 volts on capacitor $C_2$ from positive terminal 16 to common terminal 18, and −25 volts on capacitor $C_3$ from common terminal 18 to terminal 17. During the positive half of the a.c. cycle the diode $D_2$ in the negative branch will be reverse-biased and will not conduct during any part of the positive half cycle. The diode $D_1$ in the positive branch is reverse-biased until the input voltage exceeds +25 volts; then diode $D_1$ will conduct through the remainder of the positive voltage lobe until the input voltage drops below +25 volts. Diode $D_1$ is then reversed-biased during the rest of the cycle. Diode $D_2$ operates similarly except in a negative sense.

Assuming effective 117 volts a.c. input voltage across terminals 12, 13, then the peak instantaneous voltage is 165.5 volts. Allowing a 0.5 volt drop for each diode, and other minor losses, the peak-to-peak voltage $V_{p-p}$ is 330 volts. The effective voltage E across the equivalent input capacitor $C_1$ is then $$E = (V_{p-p}\text{-}V_L/2.828)$$

The impedance of this circuit appears double that normally computed for a capacitor $C_1$ since ½ the current flows from point 17(−) to point 16(+), ½ the current is available at point 18 and flows from point 19(−) to point (20+) in circuit of FIG. 3 for example.

$$Z_c = 2 \times \frac{1}{2\pi FCl},$$

where F is the frequency.

If F = 60 Hz and $C_1$ = 0.000001 farad
$1/Z_c = 0.0001885$
For $C_1 = 1$ mfd, the expression for $I_L$ then becomes $$I_L \simeq \frac{(330 - V_L) \times .0001885}{2.828} \times CF \text{ (Correction Factor)}$$

Further simplification gives:

$I_L \simeq (330\text{-}V_L) \times 0.0000668 \times CF$ (Correction Factor)

Where $I_L$ is expressed in milliamperes and where, for any size, input capacitor C1 is expressed in mfd
$I_L \simeq (330\text{-}V_L) \times 0.0668 C \cdot CF$ (Correction Factor)

It will be seen that the a.c. line current will decrease somewhat as the load voltage $V_L$ increases, namely, with increased load impedance. However, with the usual range of loads to be energized by this power supply, $V_L$ is relatively small, the maximum being of the order of 60 volts and the minimum being 0 volts (short circuit). The maximum change in $I_L$ from the center value ($V_L$ = 30) of this range would be about 13%.

The load voltage $V_L$ is a function of load impedance and the maximum a.c. ripple from negative terminal 17 to positive terminal 16 is relatively small, being of the order of 0.9 volts a.c. at 120 Hz. The ripple and voltage variations may be attenuated by increasing the capacitance of the output capacitors $C_2$ and $C_3$.

It should be noted that voltage regulation cannot be used, since if the circuit impedance is low, voltage will be low. However, voltage limiting will probably be desirable for most solid state circuits. A voltage limiting device, such as a zener diode, will prevent excess voltage by dividing the current between load and the zener diode.

For the FIG. 2 embodiment, the line current is given in milliamperes by $$I_L \approx (165-V_L) \times 0.0668 \times C_1 \times CF \text{ (Correction Factor)}$$

where C is the capacitance of input capacitor $C_1$ in mfd. The ripple frequency in this embodiment is equal to the input line frequency.

To change the polarity of terminal 17 from negative to positive, it is merely necessary to reverse the polarities of the diodes $D_1$ and $D_2$ and that of capacitor $C_3$ if it is of the polarized type.

The mathematics used in the above equations are linear algebraic solutions and are approximations that are valid only when the input voltage is 5 to 10 times the D.C. output voltage. A Correction Factor CF is required for better accuracy. More accurate values may be determined by using Integral Calculus. The Correction Factor as shown in the table below has been calculated from Integral Calculus and may be used to change the algebraic formula to yield a solution that conforms to that obtained by partial integration. To use the table it is first necessary to compute the % which is the d.c. load voltage divided by the a.c. voltage expressed as a percentage, or $$\% = \frac{V_{DC}}{V_{ACRMS}}$$

CORRECTION FACTOR TABLE

| % | CF | % | CF | % | CF | % | CF | % | CF |
|---|----|---|----|---|----|---|----|---|----|
| 2 | .99 | 20 | .89 | 38 | .80 | 80 | .60 | 150 | .31 |
| 4 | .98 | 22 | .88 | 40 | .79 | 85 | .57 | 160 | .28 |
| 6 | .97 | 24 | .87 | 45 | .76 | 90 | .55 | 170 | .24 |
| 8 | .96 | 26 | .86 | 50 | .74 | 95 | .53 | 180 | .21 |
| 10 | .95 | 28 | .85 | 55 | .71 | 100 | .51 | 190 | .18 |
| 12 | .93 | 30 | .84 | 60 | .69 | 110 | .47 | 200 | .15 |
| 14 | .92 | 32 | .83 | 65 | .67 | 120 | .42 | 220 | .10 |
| 16 | .91 | 34 | .82 | 70 | .64 | 130 | .39 | 240 | .06 |
| 18 | .90 | 36 | .81 | 75 | .62 | 140 | .35 | 260 | .02 |

In a typical design of a full-wave power supply according to FIG. 1, diodes $D_1$ and $D_2$ were both of the 1N2858 type, the input capacitors C1A and C1B were 6 mfd each, the output capacitors $C_2$ and $C_3$ were 2000 mfd each and the input voltage was 117 volts a.c. A 500 ohm load impedance developed a load voltage $V_L$ of 26 volts d.c. Referring to the preceding formulas:

the equivalent capacitance C1 = 3 mfd;

$$V_{p-p} = 117 \times 2.828 = 330V;$$

$$\% = \frac{26}{117} = 22\%; \text{ from table, } CF = .88;$$

Substituting in the formula $I_L = (V_{p-p} - V_L) \times 0.00668 \times CF \times C1$ we get $I_L = (330-26) \times 0.0668 \times 0.88 \times 3 = 54$ ma. With the two capacitors C1A and C1B the a.c. line current or $I_{ac}$ in FIG. 3, for example, would be 104 ma. and could achieve a maximum of only about 132 ma at short circuit, which can be safely substained.

Input a.c. voltage variations, such as short-duration voltage drops or voltage spikes, have negligible effect on the output, due to the presence of the relatively large output capacitors $C_2$ and $C_3$, which tend to retain their normal charges and thereby provide large charging time constants.

In both of the FIG. 1 and FIG. 2 described embodiments there can be a large range of variation of load impedance Z and load voltage $V_L$ with a relatively small change in line current. The same power supply circuit can be used with load devices which require different d.c. supply voltages $V_L$, from zero to the order of 50 volts or more; a value of C1 may be employed in accordance with the required conditions. The input capacitor may have a wide range of values, as low as a few picofarads to several hundred microfarads. The value required for a specific application will depend on the input voltage, frequency, wave form, and output current and voltage desired. The diodes $D_1$ and $D_2$ are dependent on the current rating and d.c. voltage required. The output capacitors $C_2$ and $C_3$ are rated according to the output d.c. voltage $V_L$ and the amount of a.c. ripple allowable. For a low a.c. ripple the ratio of capacitance between the output and input capacitors should be several hundred to one.

The circuits are usable for low-voltage, low-current applications, low-current, high-voltage applications; also, for high-current, low-voltage, and high-current, high-voltage applications. Usable output d.c. voltage from 0 to 2.5 times input voltage may be developed, with proper design, and the output current may be from a few microamperes to several hundred amperes.

The input capacitor C1 value sets the value of the substantially constant circuit current $I_L$, as well as that of the substantially constant output current. As previously mentioned, and as shown in dotted view in FIG. 1, additional capacitors may be switched in parallel with the capacitors C1A and C1B to increase the circuit current $I_L$, if required.

The FIG. 3 and FIG. 4 circuits described are examples of some of the basic modifications to the FIG. 1 Constant Current Power Supply. A large number of additional variations are possible. The circuits, or sections thereof, may be inverted, paralleled, or placed in series. Combinations of the above, are also possible. By inversion is meant reversal. For example, the polarity of the diodes may be reversed. As a further example, in FIG. 4 the positions of the four diodes may be interchanged with those of the four output capacitors. In such instance, the input is connected to the capacitors $C_2$ and $C_3$, $C_4$ and $C_5$. The d.c. outputs are then across the diodes and terminal 21 is a common junction for the diodes. The resulting load currents would be the same as in FIG. 4.

Various other changes in the described circuits are possible. In FIG. 4, the common junction may float as a ground or may be connected to a center tap of a transformer when the latter is used as the A.C. generator. In the latter instance, the currents I, and $I_2$ would not necessarily be equal. In FIG. 3, two additional loads may be added across terminal 18 and 19 and 18 and 20.

In FIG. 3, the following additional changes are possible:

Terminals 19 and 20 may be connected to provide a common; the currents will remain the same and no current will flow through the short between 19 and 20. Point 16 will be positive, points 19 and 20 zero, and point 17 will be negative. Voltage limiting may be used between points 16 and 19, points 20 and 17, or from point 16 to 17.

Terminal 19 may be shorted to point 17. The currents from point 19 to point 16 and from point 17 to point 20 will remain equal. Both points 16 and 20 will be positive and may be voltage limited to the same or different values.

Terminal 16 and 17 may be connected, and point 20 will be positive and point 19 negative.

Terminals 16 and 20 may be connected to provide two negative voltages at points 17 and 19.

Terminals 17 and 20 may be connected to provide a common, currents will remain the same, and no current will flow through the short between 17 and 20. Point 16 will be positive points 17 and 20 zero, and point 19 will be negative. Voltage limiting may be used between points 16 and 17, points 19 and 20, or from point 16 to point 19.

Terminal 19 may be shorted to point 17. The currents from point 19 to point 20 and from 17 to point 16 will remain equal. Both point 16 and 20 will be positive and may be voltage limited to different values.

While certain specific embodiments of constant current power supply circuits have been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A constant current power supply for multiple d.c. loads, comprising
    a pair of A.C. input terminals,
    an input capacitor connected at one side to one of the input terminals, and means for providing a constant current through a load, said means comprising
    a pair of parallel branch circuits each connecting the other side of said input capacitor to the other input terminal, each of said branch circuits being a series circuit including a first diode, a positive D.C. output terminal, a fixed output capacitor, a negative D.C. output terminal, and a second diode,
    the diodes of one branch circuit being oppositely poled with respect to the diodes of the other branch circuit, and
    the output capacitors having long time constants of charge and discharge.

2. The constant current power supply of claim 1, wherein a second input capacitor is inserted between the said other input terminal and the said pair of parallel branch circuits.

3. The constant current power supply of claim 2, wherein said first and second input capacitors are of approximately equal value.

4. The constant current power supply of claim 2, wherein said output capacitors of both branch circuits are of approximately equal value.

5. The constant current power supply of claim 2, wherein the ratio of capacitance between the said output and input capacitors is several hundred to one.

6. The constant current power supply of claim 2, wherein fifth and sixth D.C. output terminals are provided at the junctions of said input capacitors with said parallel branch circuits enabling selective connection of as many as eight D.C. loads across various parts of said six output terminals.

7. The constant current power supply of claim 2, wherein a second fixed output capacitor is inserted in each of said branch parallel circuits.

8. The constant current power supply of claim 7, wherein fifth and sixth D.C. output terminals are provided at the junctions of said input capacitors with said parallel branch circuits and the seventh D.C. output terminal is provided as a common junction to the first and second output capacitors in both parallel branch circuits enabling selective connection of as many as twelve D.C. loads across various pairs of said seven output terminals.

* * * * *